United States Patent [19]

Heffner

[11] 4,441,568

[45] Apr. 10, 1984

[54] WEIGHTING SCALE HAND SUPPORT DEVICE

[76] Inventor: Edna V. Heffner, 8808 Dempsey Ave., Sepulveda, Calif. 91343

[21] Appl. No.: 304,353

[22] Filed: Sep. 22, 1981

[51] Int. Cl.³ .................. G01G 19/00; G01G 21/22
[52] U.S. Cl. .................... 177/129; 177/262; D10/87
[58] Field of Search ............ 177/144, 253, 255, 262, 177/129; D10/87

[56] References Cited

U.S. PATENT DOCUMENTS 3,279,549 10/1966 Feinberg et al. .............. 177/262 X
4,013,135 3/1977 Kechely .......................... 177/144

*Primary Examiner*—George H. Miller, Jr.

[57] ABSTRACT

The improved weighing scale support device comprises an upright hand support which may be, for example, generally T-shaped or inverted U-shaped, and means for attaching the hand support to the moveable weighing platform of a scale rather than to the fixed portion of the scale. The support comprises a generally vertical portion and a generally horizontal portion and is preferably adjustable vertically and/or horizontally. For example, it may include as the vertical portion one or a plurality of hollow vertical tubes having vertical rods slideably disposed and adjustably pinned in the tubes. The horizontal portion may include a crossbar to which is hinged a pair of foldable arms. Alternatively, the horizontal portion may be arcuate with fixed arms bearing handles. The hand support attaching means may be a sleeve slideable over the top, back, front and a portion of the bottom of the moveable weighing platform of a scale. The sleeve can have a closed end and a closeable opposite open end. The hand support can be specially configured to represent a vehicle, winged horse, upright human or animal or the like. In the case of a human or animal figure, the figure's forwardly extended hands are adapted to be gripped by the patient. The device is simple and inexpensive and is adapted to permit safe weighing of children, invalids and the like.

10 Claims, 11 Drawing Figures

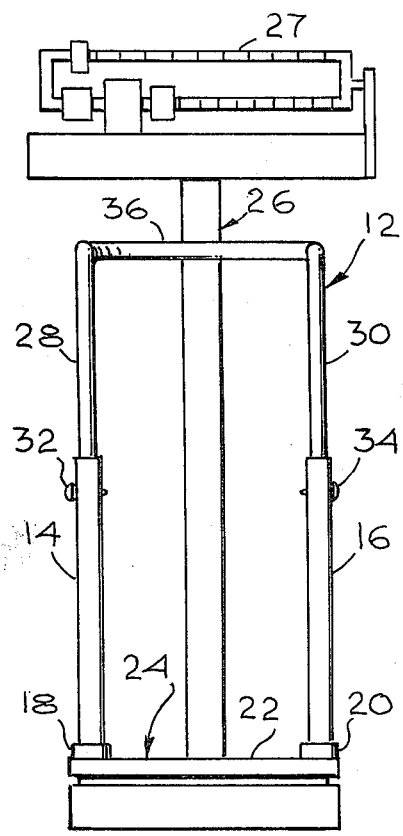
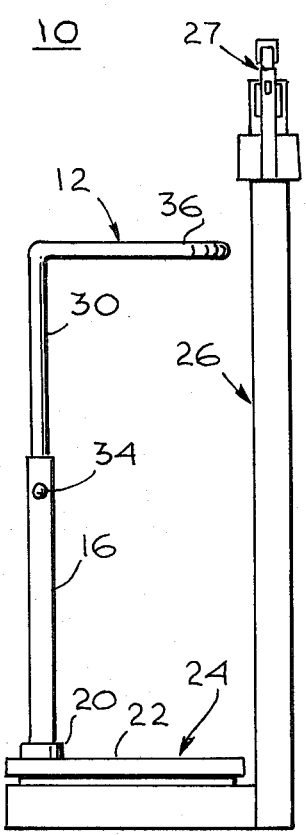
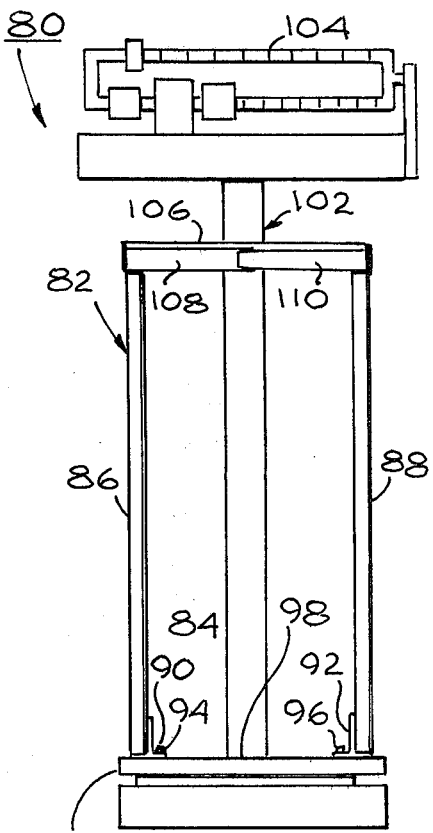
Fig. 1
Fig. 2
Fig. 4
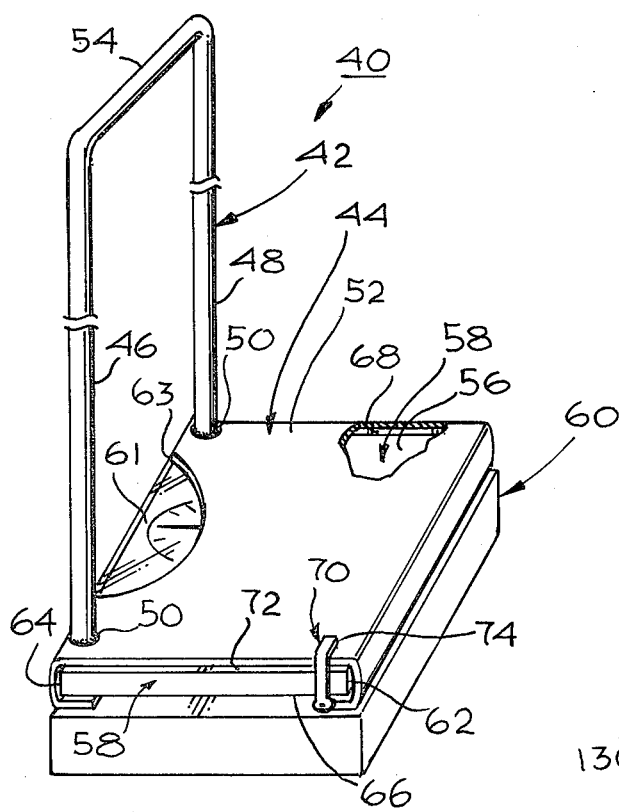
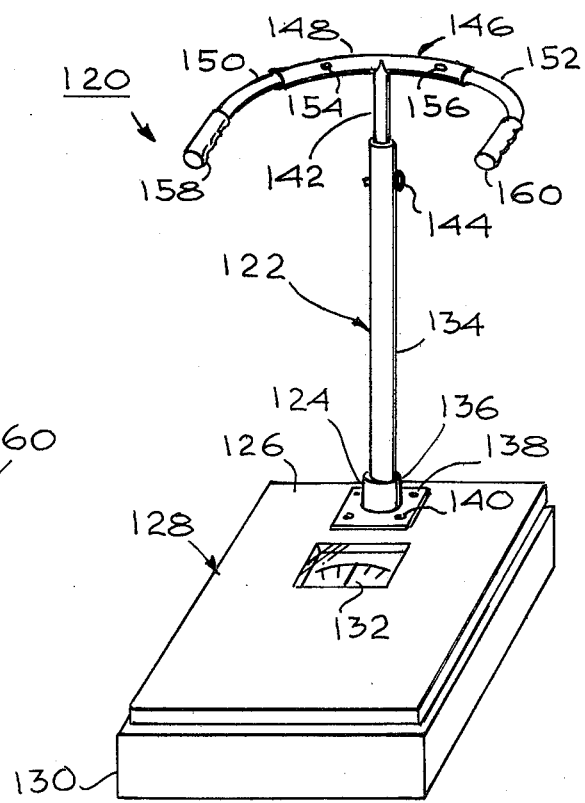
Fig. 3
Fig. 5

WEIGHTING SCALE HAND SUPPORT DEVICE

BACKGROUND OF THE INVENTION

1. Field of the Invention

The present invention generally relates to weighing aids and more particularly to an improved hand support for attachment to the moveable weighing platform of a scale.

2. Prior Art

Various types of weighing apparatus have been proposed for the safe weighing of patients of selected ages and physical conditions. Many of such devices require the use of specially designed, expensive and complicated scales, such as those disclosed in U.S. Pat. Nos. 3,032,131 and 3,998,284. Certain devices such as those shown in U.S. Pat. Nos. 3,998,284, 3,279,549 and 4,013,135 can only be used for limited purposes. Most of the specially designed apparatus is for reclining and/or seated patients and much of such equipment is attached to the fixed portion of a weighing scale. If the patient utilizes such equipment to steady himself or herself there is a danger his or her weight will be transferred thereto, thereby decreasing the weight registering on the scale and providing a false reading.

All of this equipment is so costly, cumbersome, and specialized that it can be used almost solely in hospitals or other "in-patient" facilities; there is no practical, unobtrusive and versatile device for use in a doctor's office or clinic setting.

There is a need for improved hand support safety means for use by ambulatory patients of various ages during weighing of such patients which will not provide a false weight reading. Such hand support should be simple, inexpensive and easy to attach to a scale and adaptable to a wide variety of conventional weighing platforms. In the case of young patients, the hand support should be one which induces cooperation by the patients and will amuse the patient.

Examples of types of patients requiring the use of a simple hand support are: toddlers; neurologically, orthopedically, or rheumatologically handicapped; those requiring crutches or walker for ambulation; very weak patients; and others—patients found in almost all general medical or clinical populations as well as many specialized medical or clinical practices.

The device should not consume precious time in attaching or removing. It should require no sacrifice of limited space for storage. And it should not protrude beyond the horizontal dimensions of the scale proper in order to protect staff and patients from possible safety hazard or inconvenience.

SUMMARY OF THE INVENTION

The improved weighing scale hand support device of the present invention satisfies all of the foregoing needs. The device is substantially as set forth in the Abstract above. Thus, the device is simple, inexpensive, readily attachable to the weighing platforms of various types of conventional scales and provides increased safety and convenience for both young and the older users.

The device comprises an upright hand support having a generally vertical lower portion and a generally horizontal upper portion connected thereto, and means for attaching the lower portion of the hand support to the moveable weighing platform of a scale. Preferably, the hand support is adjustable in heighth and width to accommodate the users of various sizes and shapes. The overall configuration of the hand support may be an inverted U or a T or the like. In one embodiment, a pair of spaced hollow vertical tubes are secured, as by adhesive, bolts, etc. to the upper surface of a weighing platform and the lower ends of a pair of vertical rods are slideably received therein. The upper ends of the rods support a rearwardly curved horizontal guardrail or crossbar. The height of the rods in the tubes is controlled by removable and/or adjustable pins extending through the tubes and rods, or by a ratchet device.

In another embodiment, hand support is inverted U-shaped, with the lower ends secured to a base support sleeve which overlaps the top, front, rear and a portion of the bottom of the weighing platform of a scale. The sleeve may be closed at one side and closeable at the other side to hold it in place. This base support can be stabilized further by means of pre-applied adhesive.

In a third embodiment, the hand support is in the form of a three dimensional figure, such as a winged horse, or an upstanding animal, or person or a vehicle. In the case of the vehicle or riding animal, a young person to be weighed, sits thereon and grasps handles, wings, etc. provided on the device as hand supports. In the case of standing animals or persons, a youngster to be weighed stands near thereto on the weighing platform and holds the hands, paws, etc. of the figure. Various other features are set forth in the following detailed description and accompanying drawings.

BRIEF DESCRIPTION OF THE DRAWINGS

FIG. 1 is a schematic front elevation of a first preferred embodiment of the improved weighing scale hand support device of the present invention, shown mounted on a weighing scale;

FIG. 2 is a schematic side elevation of the device of FIG. 1 shown mounted on a weighing scale;

FIG. 3 is a schematic perspective view, partly broken away, of a second preferred embodiment of the improved weighing scale hand support device of the present invention, shown mounted on a weighing scale;

FIG. 4 is a schematic front elevation of a third preferred embodiment of the improved weighing scale hand support device of the present invention, shown mounted on a weighing scale;

FIG. 5 is a schematic perspective view of a fourth embodiment of the improved weighing scale hand support device of the present invention, shown mounted on a weighing scale;

DETAILED DESCRIPTION OF THE PREFERRED EMBODIMENT

FIGS. 1 and 2

Figure 6:
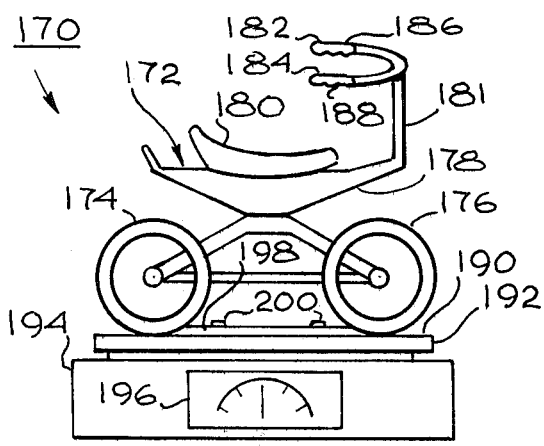
FIG. 6 is a schematic front elevation of a fifth embodiment of the improved weighing scale hand support device of the present invention in the form of a bicycle, shown mounted on a weighing scale.

A first preferred embodiment of the improved weighing scale hand support device of the present invention is schematically depicted in FIGS. 1 and 2. Thus, device 10 is shown which comprises a hand support 12 in the form of an inverted U. Support 12 has a pair of spaced, parallel, vertical hollow tubes 14 and 16 secured at their lower ends to cups 18 and 20, in turn secured as by adhesive (not shown) to the upper horizontal surface 22 of the moveable weighing platform 24 of an upright scale 26 having an upper crossbar 27 with weights.

Vertical rods 28 and 30 slide within tubes 14 and 16, respectively, and are releasably pinned at desired heights therein by pins 32 and 34 disposed horizontally through alignable apertures (not shown) in tubes 14 and 16 and the associated rods 28 and 30. If desired, a single pin 32 or 34 can be used in a single set comprising rod 28 and tube 14 or rod 30 and tube 16 since rods 28 and 30 are joined at their upper ends to a single rearwardly curved horizontal guiderail 36. When a person is to be weighed, he or she steps onto platform 24 between tubes 14 and 16 and grasps arcuate rail 36 to steady himself or herself, thus preventing injury by falling off platform 24.

Device 10 can be made simply and inexpensively of plastic, wood, metal, ceramic, hardened elastomer or the like or a combination thereof and is durable, adjustable and attractive in appearance. Cups 18 and 20 can, if desired, include flanges (not shown) securable, as by bolts, screws or the like (not shown) to platform 24.

FIG. 3

A second preferred embodiment of the improved weighing scale hand support device of the present invention is schematically depicted in FIG. 3, thus, device 40 is shown, which comprises a hand support 42 connected to a base securing means in the form of a sleeve 44. Support 42 is in the form of an inverted U, having a pair of spaced vertical rods 46 and 48 secured at their lower ends, as by welding 50 to the upper horizontal surface 52 of sleeve 44 and integral at their upper ends with crossbar 54 which serves as a handrail. This same sleeve attachment can be with any other embodiments of the support members shown in the alternate embodiments shown herein.

Sleeve 44 overlies the upper surface 56 of the moveable weighing platform 58 of a conventional bathroom-type scale 60 or the like, and also overlays the front and rear edges 62 and 64 of platform 58. Moreover, sleeve 44 lays under edges 62 and 64 and thus encloses a portion of the under surface or bottom 66 of platform 58. Sleeve 44 can be made flexible enough to pass over a raised weighing dial 61 and in any event has a cutaway portion 63 to render dial 61 visible from above. Preferably, sleeve 44 is closed by a wall 68 at one side 69 thereof and includes an openable closure means 70 at the opposite open side 72 thereof. Closure means 70 may comprise, for example, an inverted L-shaped bracket 74 hinged to sleeve 44 at side 72 and adapted to releasably block side 72 and overlie surface 52, as shown in FIG. 3.

Device 40 is simple, can be easily slid in place over platform 58 and can as easily be removed if and when desired. Device 40 will not shift when in place and provides a maximum of safety for the weigher. Sleeve 44 and rods 46 and 48, as well as bracket 72, can be made simply and inexpensively of wood, metal, plastic, hardened elastomer or the like. Device 40 functions in a simple, safe, durable and convenient mode.

FIG. 4

A third preferred embodiment of the improved weighing scale hand support device of the present invention is schematically depicted in FIG. 4. Thus, device 80 is shown which comprises hand support 82 and securing means 84. Hand support 82 comprises a spaced pair of vertical rods 86 and 88 secured at their lower ends by L-shaped brackets 90 and 92 and bolts 94 and 96 to the upper surface 98 of moveable weighing platform 100 of upright scale 102. Scale 102 has an upper crossbar 104 with counterbalance weights.

Rods 86 and 88 are connected at their upper ends to a fixed horizontal crossbar 106 to which are hingedly connected a spaced pair of horizontal arms 108 and 110, moveable between the closed folded flat position shown in FIG. 4 and an open position projecting forward of bar 106 at a 90° angle thereto. Bar 106 and arms 108 and 110 serve as a guardrail and hand support for persons weighing themselves in the upright position on platform 100. Device 80 is simple, inexpensive, durable and convenient and can be fabricated of materials similar to those of devices 10 and 40.

FIG. 5

A fourth preferred embodiment of the improved weighing scale hand support device of the present invention is schematically depicted in FIG. 5. Thus, device 120 is shown which comprises a hand support 122 and attached connector 124 for securing support 122 to the upper surface 126 of the inset weighing platform 128 of a bathroom type scale 130 having a weighing dial 132.

Hand support 122 includes a vertical hollow tube 134, the lower end of which is seated in an annular upstanding collar 136, in turn secured to a flat horizontal plate 138 secured, as by screws 140, to surface 126 of platform 128.

A vertical rod 142 is slideably disposed in tube 134 and is pinned in a selected one of a number of positions vertically therein by headed pin 144 extending horizontally through aligned openings (not shown) in the tube 134 and in rod 142. The upper end of rod 142 is secured to the center of an arcuate forwardly extending hand rail 146 comprising a hollow curved tube 148 centrally located and slideably receiving curved rods 150 and 152 adjustably releasably secured therein by pins 154 and 156 extending through tube 148 and through rods 150 and 152, respectively. The free forward ends of rods 150 and 152 are fitted with contoured handles 158 and 160 of rubber or the like to facilitate gripping by the weigher during weighing. Device 120 is simple, inexpensive, durable and well adapted for use with scales of the type shown, as well as other conventional weighing scales, providing the same with improved safety, particularly for weakened patients and the like.

FIG. 6

A fifth preferred embodiment of the improved weighing scale support device of the present invention is schematically depicted in FIG. 6. Thus, device 170 is shown. Device 170 is in the form of a vehicle 172, in this instance a bicycle having a pair of wheels 174 and 176 connected to a frame 178 bearing a seat 180 and a fork 181 comprising a pair of handle bars 182 and 184 bearing hand grips 186 and 188.

Frame 178 is secured to the upper surface 190 of a moveable weighing platform 192 of a scale 194 having a weighing dial 196, as by a flat plate 198 welded to wheels 174 and 176 and bolted, as by bolts 200, to platform 192. Alternatively, plate 198 can be welded or glued to surface 190. When a youngster is to be weighed, he or she is lifted onto seat 180 and made to hold grips 186 and 188 securely. Vehicle 172 thus amuses the youngster while the weighing operation is carried out in safety. Device 170 is simple, attractive and useful. Components thereof can be inexpensively fabricated of metal, plastic, wood, etc.

FIG. 7

Figure 7:
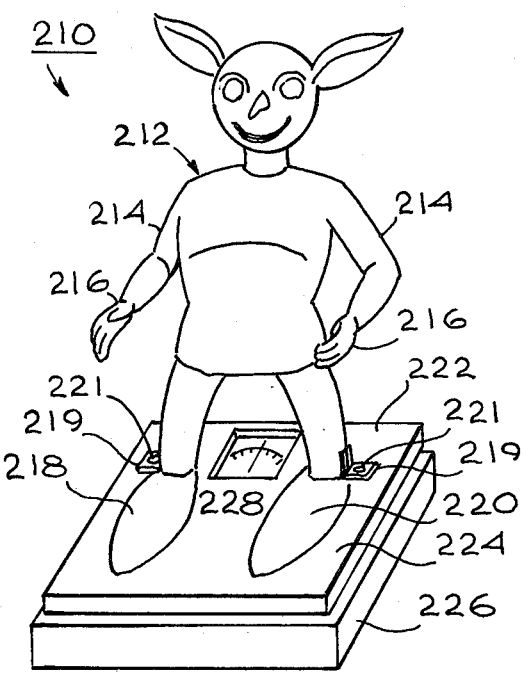
FIG. 7 is a schematic front elevation of a sixth embodiment of the improved weighing scale hand support device of the present invention in the form of a standing mouse cartoon character, shown mounted on a weighing scale; and, FIG. 8 is a schematic front elevation of a seventh embodiment of the improved weighing scale hand support device of the present invention in the form of a winged horse, shown mounted on a weighing scale.

A sixth preferred embodiment of the improved weighing scale hand support device of the present invention is schematically depicted in FIG. 7. Thus, device 210 is shown which comprises a three dimensional upright cartoon character 212 having forwardly extending arms 214 and hands 216, the latter adapted to be gripped by a youngster while he or she stands facing character 212 in the foot outlined areas designated 218 and 220 immediately in front of character 212. Foot outline areas could be of a non-skid material, not attached to the rest of the figure but applied with an adhesive to the weighing platform. Alternatively, the foot areas could be painted on the platform. Character 212 is shown mounted, as by L-shaped brackets 219 and bolts 221 in the standing position on the upper surface 222 of the moveable weighing platform 224 of a flat bathroom type scale 226 having a weighing dial 228. Character 212 is shown in the form of a mouse-like figure and is amusing in appearance.

The youngster is safely steadied on platform 224 in the correct standing weighing position on foot outlines 218 and 220 by holding the hands 216 of character 212, thus keeping the interest of the youngster during the weighing process. Device 210 is simple, inexpensive, attractive and interesting, providing a safety factor in the standing position for youngsters being weighed. Components of device 210 including character 212 can be fabricated of metal, cloth, plastic, wood, etc.

FIG. 8

Figure 8:
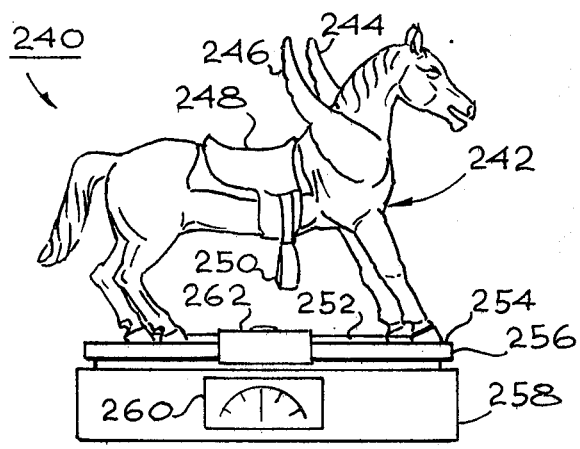

A seventh preferred embodiment of the improved weighing scale hand support device of the present invention is schematically depicted in FIG. 8. Thus, device 240 is shown in the form of a horse 242 having a pair of curved rearwardly extending wings 244 and 246 adapted to servie as secure hand grips for a youngster while securely seated on saddle 248 with his or her feet in stirrups 250. The bottom of horse 242 is connected to a horizontal plate 252 resting on upper surface 254 of the moveable platform 256 of a weighing scale 258 bearing a weighing dial 260. A spring tension clamp 262 overlies plate 252 and strongly grips the front and rear edges of platform 256, holding horse 242 securely and releasably in place on scale 258.

Thus, device 240 keeps a youngster seated safely and securely in the proper positon on horse 242 during weighing on scale 258. The youngster enjoys the free ride and willingly cooperates in the weighing process. Device 240 is simple and inexpensive to fabricate of metal, cloth, plastic, wood and the like for an attractive durable appearance.

Figures 9, 10:
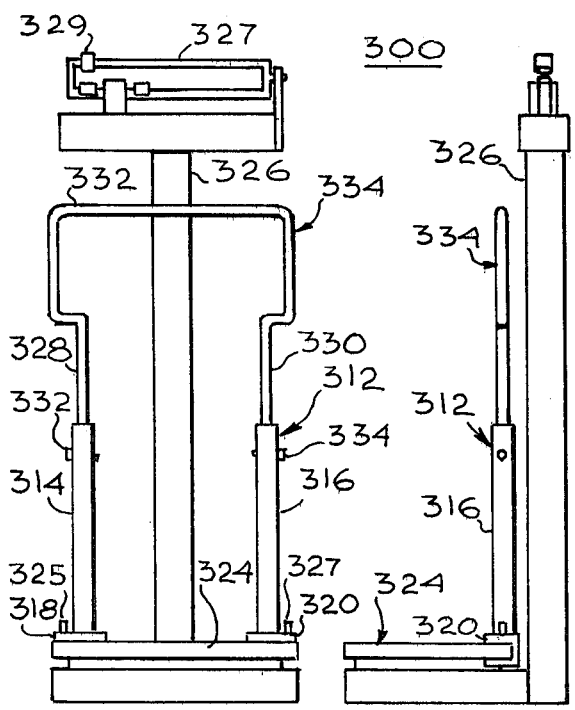
FIG. 9 is a schematic front elevation of another preferred embodiment of the improved weighing scale hand support device of the invention, shown mounted on a weighing scale.
FIG. 10 is a schematic side elevation of the device of FIG. 10.

FIGS. 9 and 10

FIGS. 9 and 10 show still another preferred embodiment of the improved weighing scale, and is similar to the embodiment shown in FIGS. 1 and 2 but showing a different support which is attached to the rear of platform.

Thus, device 300 is shown which comprises a hand support 312 in the form of an inverted U, Support 312 has a pair of spaced, vertical, hollow tubes 314 and 316 secured at their lower ends to clamp members 318 and 320, which clamp members 318 and 320 secure tube 314 and 316 to weighing platform 324 by locking screws 325 and 327. Weighing platform 324 is a part of upright scale 326 having an upper crossbar 327 with weights 329.

Vertical rods 328 and 330 slide within tube 314 and 316 respectively and are releasably pinned at desired heights therein by pins 332 and 334 disposed horizontally through alignable apertures (not shown) in tubes 314 and 316 and the associated rods 328 and 330. Rods 328 and 330 are connected via, upper segment 332 to provide a continuous hand support member 334. As opposed to the embodiment shown in FIGS. 1 and 2 support member 334 lies in substantially a single plane and is secured to the rear of platform 324. This embodiment does not provide side rails which might interfere with weighing obese patients.

FIG. 11

Figure 11:
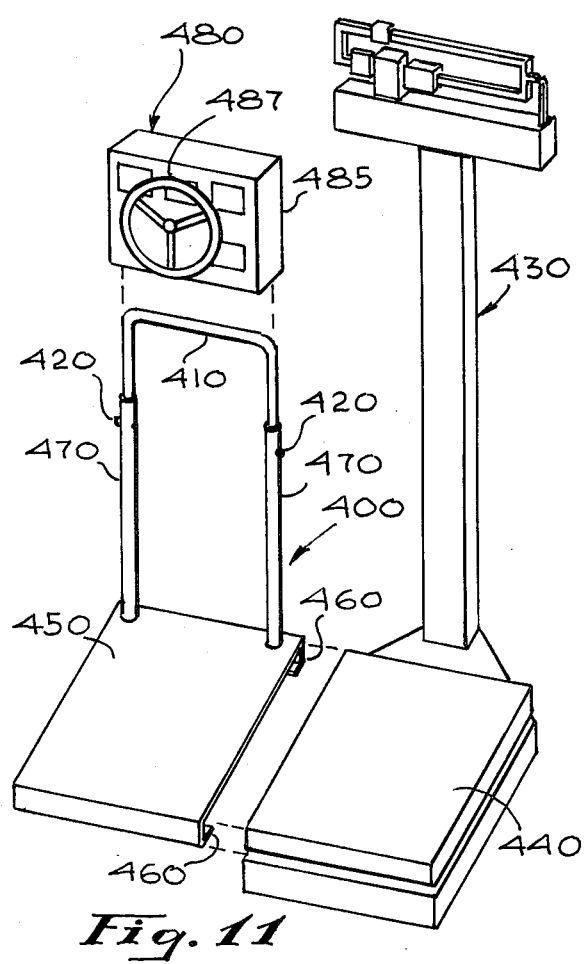
FIG. 11 is an exploded isometric showing of still another preferred embodiment of the invention which utilizes a removable hand support device especially adapted for use by children.

FIG. 11 is an exploded, isometric view of still another embodiment of the invention.

Shown therein is a standard up-right scale 430 having a weighing platform 440. Removable support device 400 has a base member 450 with lip portions 460 adapted to slide over platform 440. Tubular members 470 retain hand support 410 at a preselected height by retaining means 420.

A removable play unit 480 is adapted to slide over the top of hand support 410 and contains a replica of an automobile dash board 485 with a rotatable steering wheel 487. If desired, other and different play units might be employed; e.g., 2 or 3 dimensional figures of animals, cartoon characters, persons or vehicles, or toy machine consoles (such as shown herein). These can be used interchangeably and can readily be secured by straps, hooks, clamps, snaps etc. (not shown). If desired, lateral support means for the handicapped can be added to the basic support 400.

It is apparent that tubular members 470 can be immovably secured directly to platform 440 if desired. Further, a single support 410 might be directly secured to base 450 or platform 440 without providing telescoping or other height adjustment means. The specific type of retaining means 420 used for holding the support 410 at a pre-selected height is considered to be a matter of choice. For example, other well known locking devices such as ratcheting devices utilizing step-on button could readily be employed without departing from the scope of the invention.

Various other features of the present invention are set forth in the foregoing. It will be noted that the improved hand support is in each instance attached to the moveable weighing portion of a scale, so that it is fully useable during the weighing operation without distorting the weight readings, once allowance for the weight of the support is first made. Various changes, modifications, alterations and additions can be made in the improved weighing scale hand support device of the present invention and in its components and their parameters. For example, one might provide support devices in the form of a steering wheel and auto dashboard console, with windshield and mirror, that is removeably secured to the platform, which would allow children to amuse themselves while being weighed, and concurrently unconsciously supporting themselves.

What is claimed is:

1. An improved weighing scale hand support device, accessible to ambulatory patients from 3 sides, said device comprising, in combination:
   a. an upright hand support having a generally lower vertical portion and a generally horizontal upper portion connected thereto and,
   b. means for attaching said generally vertical portion of said hand support to the moveable weighing platform portion of a scale.

2. The improved scale support device of claim 1 wherein said generally vertical portion comprises an upstanding pipe and wherein said attaching means includes a vertical sleeve encircling and gripping the lower end of said pipe and a flat horizontal plate secured to the bottom of said sleeve and means for securing said plate to the upper surface of a moveable weighing platform of a scale.

3. The improved scale support device of claim 1 wherein said hand support is attached to the rear of the platform by releasable clamping means.

4. The improved scale support device of claim 1 wherein said means for attaching said generally vertical portion of said hand support to a scale includes a sleeve adapted to slideably fit over the top, front, back and a portion of the bottom of the moveable weighing platform of a scale.

5. The improved scale support device of claim 4 wherein said sleeve is closed at one side adapted to abut one side of the moveable weighing platform of a scale and open at the opposite side of said sleeve, and wherein releasable closing means are secured to said open side for releasably closing said open side to hold said sleeve in place on the moveable weighing platform of a scale.

6. The improved scale support device of claim 1 wherein said hand support comprises an upright figure having forwardly extending grippable hands.

7. The improved scale support device of claim 6 wherein said figure is selected from three dimensional human and animal figures.

8. The improved scale support device of claim 1 wherein said hand support is adjustable vertically.

9. The improved scale support device of claim 8 wherein said generally vertical portion of said hand support includes at least one vertical hollow tubular member, a rod slideably disposed in said tubular member and releasable stop means connected to and releasably securing said rod in a selected position in said tubular member.

10. The improved scale support device of claim 8 wherein said generally horizontal portion of said hand support includes a fixed crossbar and a pair of foldable arms hingedly connected to said crossbar.

* * * * *